(12) United States Patent
Hennigan

(10) Patent No.: US 12,503,419 B2
(45) Date of Patent: Dec. 23, 2025

(54) SEPARATION PROCESS AND APPARATUS

(71) Applicant: Ineos Acetyls UK Limited, Lyndhurst (GB)

(72) Inventor: Sean Anthony Hennigan, Hull (GB)

(73) Assignee: Ineos Acetyls UK Limited, Lyndhurst (GB)

(*) Notice: Subject to any disclaimer, the term of this patent is extended or adjusted under 35 U.S.C. 154(b) by 781 days.

(21) Appl. No.: 17/785,748

(22) PCT Filed: Dec. 15, 2020

(86) PCT No.: PCT/EP2020/086281
§ 371 (c)(1),
(2) Date: Jun. 15, 2022

(87) PCT Pub. No.: WO2021/122642
PCT Pub. Date: Jun. 24, 2021

(65) Prior Publication Data
US 2023/0052743 A1 Feb. 16, 2023

(30) Foreign Application Priority Data
Dec. 17, 2019 (EP) .................................. 19217253

(51) Int. Cl.
*C07C 51/12* (2006.01)
*B01D 1/16* (2006.01)
(Continued)

(52) U.S. Cl.
CPC ............... *C07C 51/12* (2013.01); *B01D 1/16* (2013.01); *B01D 1/305* (2013.01); *B01D 3/20* (2013.01);
(Continued)

(58) Field of Classification Search
CPC . B01D 1/16; B01D 1/305; B01D 3/20; B01D 3/22; C07C 51/12; C07C 51/44; C07C 53/08
See application file for complete search history.

(56) References Cited

U.S. PATENT DOCUMENTS

| | | | | |
|---|---|---|---|---|
| 3,334,027 A | * | 8/1967 | Goeldner | B01D 1/00 203/40 |
| 6,114,576 A | * | 9/2000 | Leet | C07C 51/12 560/204 |
| 2016/0187061 A1 | | 6/2016 | Urbanski et al. | |

FOREIGN PATENT DOCUMENTS

| | | |
|---|---|---|
| CN | 1395976 A | 2/2003 |
| CN | 1957069 A | 5/2007 |

(Continued)

OTHER PUBLICATIONS

International Search Report and Written Opinion of International Application No. PCT/EP2020/086281, mailed Feb. 3, 2021, 14 pages.

(Continued)

*Primary Examiner* — Andrew D Kosar
*Assistant Examiner* — Blaine G Doletski
(74) *Attorney, Agent, or Firm* — McDonnell Boehnen Hulbert & Berghoff LLP

(57) ABSTRACT

The present disclosure relates generally to processes for separating an effluent in an acetic acid production unit. Accordingly, one aspect of the disclosure provides a process including transferring at least a portion of a carbonylation reaction effluent to the bottom section of a tank, evaporating at least a portion of the effluent to form a vapour fraction, spraying a spray liquid onto a porous demister surface of a demister section of the tank, collecting and returning a liquid fraction of the effluent from at least one chimney tray in the tank to a fractionation section or the bottom section of the (Continued)

tank, and withdrawing from a top section of the tank at least a portion of the vapour fraction, the vapour fraction comprising acetic acid, the vapour fraction having been passed from the bottom section through the fractionation section, and then through one or more chimneys of the at least one chimney tray, and then through the spray section, and then through the porous demister surface of the demister section.

13 Claims, 1 Drawing Sheet

(51) Int. Cl.
  *B01D 1/30* (2006.01)
  *B01D 3/20* (2006.01)
  *B01D 3/22* (2006.01)
  *C07C 51/44* (2006.01)
  *C07C 53/08* (2006.01)
(52) U.S. Cl.
  CPC ............... *B01D 3/22* (2013.01); *C07C 51/44* (2013.01); *C07C 53/08* (2013.01)

(56) References Cited

FOREIGN PATENT DOCUMENTS

| | | |
|---|---|---|
| CN | 101743045 A | 6/2010 |
| CN | 101808973 A | 8/2010 |
| CN | 105111067 A | 12/2015 |
| CN | 105617697 A | 6/2016 |
| CN | 106621419 A | 5/2017 |
| CN | 108815980 A | 11/2018 |
| CN | 109908700 A | 6/2019 |
| EP | 0846674 | * 6/1998 |

OTHER PUBLICATIONS

Extended European Search Report of European Patent Application No. 19217253.4, mailed Feb. 10, 2020, 8 pages.

* cited by examiner

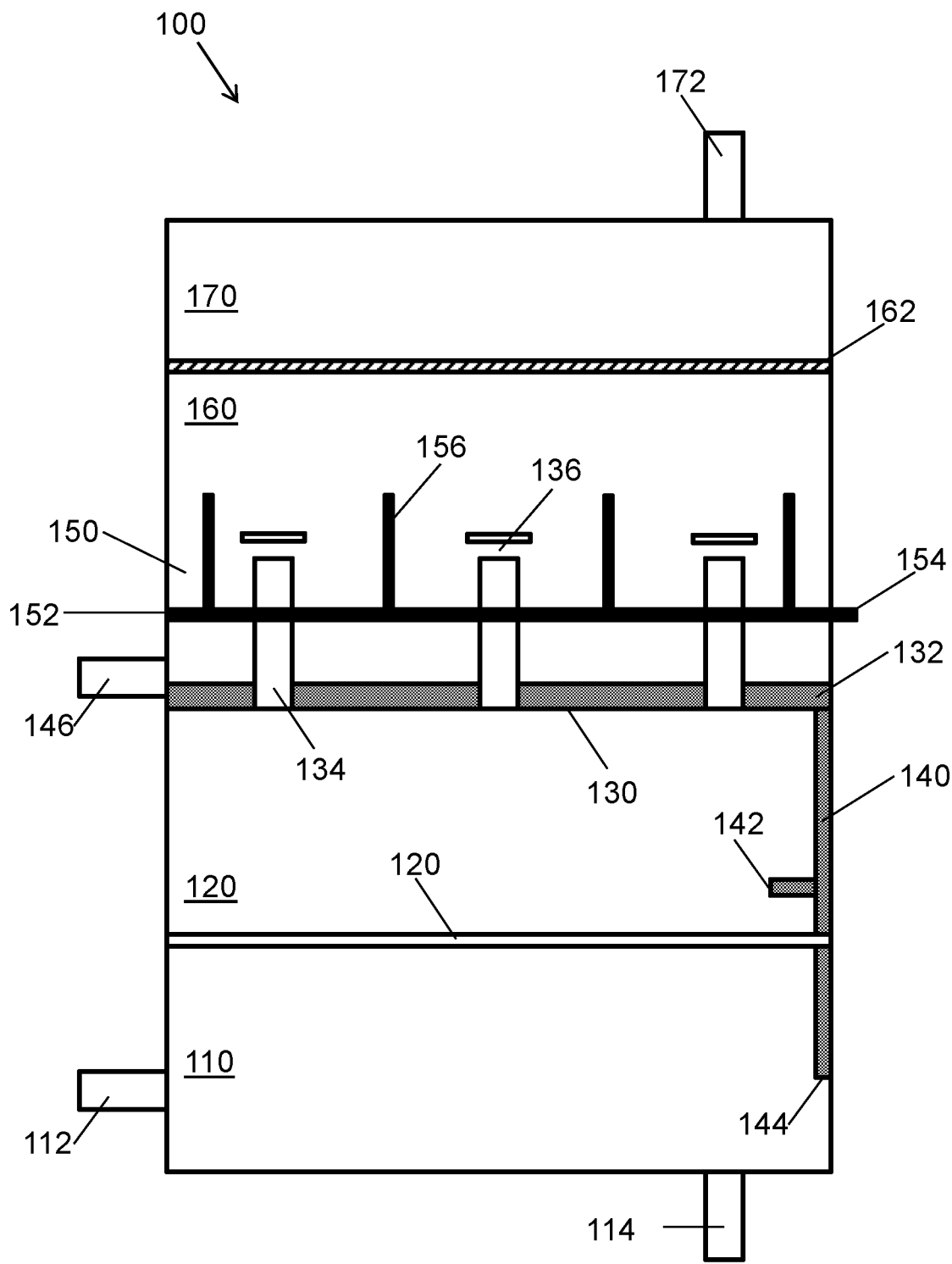

SEPARATION PROCESS AND APPARATUS

FIELD

The present disclosure relates generally to processes and apparatuses for separating an effluent in an acetic acid production unit.

TECHNICAL BACKGROUND

Commercially, acetic acid has been manufactured for many years by carbonylating methanol with carbon monoxide in the presence of a Group VIII carbonylation catalyst. Typically, carbon monoxide is contacted with methanol in the presence of a rhodium or an iridium homogeneous or heterogeneous carbonylation catalyst, methyl iodide and water in a reactor. In general, acetic acid product may be recovered by withdrawing crude acetic acid product from the reactor and separating the acetic acid product in one or more flash and/or distillation stages from the other components, such as the Group VIII metal carbonylation catalyst, methyl iodide, methyl acetate, and water.

Conventionally, effluent from the reaction zone of an acetic acid production unit is separated in a flash tank (i.e., to provide a vapour fraction comprising acetic acid). Because a degree of liquid entrainment containing solutes can occur in the flash tank, a system for catching and recovering entrained liquid within the tank must be employed. Typically, such systems include a mesh which is sprayed with liquid, and beneath the mesh, one or more fractionation trays.

However, the header pipe suppling spray liquid to the system can take up room in the vapour space, causing locally high velocity under the mesh. Moreover, the liquid flow to the fractionation trays of conventional systems is low, while upward vapour load is high. Accordingly, such fractionation trays tend to operate in a "spray" hydraulic regime, in which liquid is re-entrained back up to the mesh, ultimately causing precipitation of solutes on the mesh and/or liquid overloading of the mesh such that re-entrained liquid is carried out though the vapour outlet of the flash tank.

There accordingly remains a need to improve separation processes for effluent of a carbonylation reaction zone of an acetic acid production unit.

SUMMARY

The scope of the present disclosure is not affected to any degree by the statements within the summary.

In one aspect, the disclosure provides a process for separating an effluent of a carbonylation reaction zone of an acetic acid production unit in a tank, the effluent comprising water and acetic acid, the tank comprising
- a bottom section comprising a feed inlet;
- above the bottom section, a fractionation section;
- above the fractionation section, a spray section;
- above the spray section, a demister section comprising a porous demister surface;
- above the demister section, a top section comprising a vapour outlet; and
- at least one chimney tray having a base above the fractionation section and one or more chimneys extending from the base and providing fluid communication between the fractionation section and the spray section;

the process comprising
- through the feed inlet, transferring at least a portion of the effluent to the bottom section of the tank;
- evaporating at least a portion of the effluent to form a vapour fraction;
- from the spray section of the tank, spraying a spray liquid onto the porous demister surface of the demister section;
- in the at least one chimney tray, collecting a liquid fraction of the effluent and at least a portion of the spray liquid sprayed onto the porous demister surface of the demister section;
- returning at least a portion of the collected liquid to the fractionation section and/or the bottom section of the tank; and
- through the vapour outlet, withdrawing from the tank at least a portion of the vapour fraction of the reaction section effluent, the vapour fraction comprising acetic acid, the vapor fraction having been passed from the bottom section through the fractionation section, through the one or more chimneys of the at least one chimney tray, and through the porous demister surface of the demister section.

In certain embodiments of the processes as otherwise described herein, the reaction zone effluent further comprises one or more of methyl iodide, methyl acetate, a Group VIII metal carbonylation catalyst, and propionic acid.

In certain embodiments of the processes as otherwise described herein, the fractionation section of the tank includes one or more (e.g., one or two) fractionation trays, each having a horizontal surface area of at least 75% of the surface area of an internal cross-section of the tank.

In certain embodiments of the processes as otherwise described herein, the spray section of the tank comprises a spray header below the exits of one or more chimneys of the chimney tray, and one or more (e.g., 2-10) spray nozzles extending from the header towards the demister section and terminating above the exits of the chimneys of the chimney tray.

In certain embodiments of the processes as otherwise described herein, a portion of the collected liquid of the at least one chimney tray is withdrawn from the tank.

In certain embodiments of the processes as otherwise described herein, 0-100 vol. % (e.g., 25-100 vol. %) of the collected liquid returned from the at least one chimney tray is returned to the bottom section of the tank.

In certain embodiments of the processes as otherwise described herein, the porous demister surface comprises a mesh spanning an internal cross-section of the tank.

In certain embodiments of the processes as otherwise described herein, the porous demister surface comprises a polymer mesh or a metal mesh.

In certain embodiments of the processes as otherwise described herein, the vapour fraction withdrawn from the tank comprises at least 25 wt. %, or at least 30 wt. %, or at least 40 wt. %, or at least 50 wt. % acetic acid.

In certain embodiments of the processes as otherwise described herein, the vapour fraction withdrawn from the tank comprises 2-25 wt. % methyl iodide, 2-30 wt. % methyl acetate, and 0.5-20 wt. % water.

In certain embodiments of the processes as otherwise described herein, the pressure in the bottom section of the tank is at least 1 barg, and the pressure drop from the bottom section of the tank to the top section of the tank is at least 5 mbar, or at least 10 mbar, or at least 15 mbar, or at least 25 mbar.

In certain embodiments of the processes as otherwise described herein, at least a portion of the vapour fraction withdrawn from the tank is transferred to a light ends recovery zone of the acetic acid production unit.

In certain embodiments of the processes as otherwise described herein, at least a portion of the liquid fraction is withdrawn from the bottom section of the tank, and then at least a portion of the liquid fraction withdrawn from the tank is transferred to the reaction zone as recycle.

In another aspect, the disclosure provides a tank for separating an effluent of a carbonylation reaction zone of an acetic acid production unit, the tank comprising
- a bottom section comprising an inlet;
- above the bottom section, a fractionation section;
- above the fractionation section, a spray section including a spray header and one or more spray nozzles;
- above the spray section, a demister section comprising a porous demister surface;
- above the demister section, a top section comprising a vapour outlet; and
- at least one chimney tray having a base above the fractionation section and one or more chimneys extending from the base and providing fluid communication between the fractionation section and the spray section.

In certain embodiments of the tank as otherwise described herein, the fractionation section of the tank includes one or more (e.g., one or two) fractionation trays, each tray having a horizontal surface area of at least 75% of the surface area of an internal cross-section of the tank.

In certain embodiments of the tank as otherwise described herein, the spray section of the tank comprises a spray header below the exits of one or more chimneys of the chimney tray, and one or more (e.g., 2-10) spray nozzles extending from the header towards the demister section and terminating above the exits of the chimneys of the chimney tray.

Other aspects of the disclosure will be apparent to those skilled in the art in view of the description that follows.

BRIEF DESCRIPTION OF THE DRAWINGS

FIG. 1 shows a schematic cross-sectional view of a tank in accordance with one embodiment of the present disclosure.

DETAILED DESCRIPTION

In various aspects, the processes of the disclosure provide for separation of effluent from a carbonylation reaction zone in a tank, where the loading of a demister section of the tank with liquids comprising one or more carbonylation reaction components of by-products is desirably decreased.

Additional features of the processes of the disclosure will now be described in reference to the drawing figures.

The present inventors have determined that separating an effluent of a carbonylation reaction zone in a tank comprising a bottom section, a fractionation section above the bottom section, a spray section above the fractionation section, a demister section above the spray section, and at least one chimney tray having a base above the fractionation section and chimneys extending into the spray section and terminating above the exits of the chimneys of the chimney tray (e.g., as otherwise described herein) can desirably decrease the loading of the demister section of the tank with liquids comprising one or more carbonylation reaction components or by-products (e.g., dissolved catalyst). Advantageously such decreased loading of the demister section can minimize solute loss during separation, for example, by decreasing solute precipitation onto a porous demister surface of the demister section.

Accordingly, one aspect of the disclosure provides a process including transferring at least a portion of a carbonylation reaction effluent to the bottom section of a tank, evaporating at least a portion of the effluent to form a vapour fraction, spraying a spray liquid onto a porous demister surface of a demister section of the tank, collecting and returning a liquid fraction of the effluent from at least one chimney tray in the tank to a fractionation section or the bottom section of the tank, and withdrawing from a top section of the tank at least a portion of the vapour fraction, the vapour fraction comprising acetic acid, the vapour fraction having been passed from the bottom section through the fractionation section, and then through one or more chimneys of the at least one chimney tray, and then through the spray section, and then through the porous demister surface of the demister section.

As described above, the process includes transferring an effluent of a carbonylation reaction zone of an acetic acid production unit to the bottom section of a tank (e.g., as otherwise described herein). As used herein, an "acetic acid production unit" comprises a unit capable of producing an acetic acid product. According to an embodiment of the disclosure, an acetic acid production unit includes a reaction zone, a flash zone (e.g., comprising a tank as otherwise described herein), a light ends recovery zone comprising a light ends column, and a heavy ends column.

In certain embodiments, the reaction zone of the acetic acid production unit comprises any suitable reaction unit that can be used to produce an acetic acid-containing effluent. For example, in certain such embodiments, the reaction zone of the acetic acid production unit includes one or more reactors, within which acetic acid can be produced by carbonylation of methanol and/or a reactive derivative thereof with carbon monoxide in the presence of a Group VIII metal catalyst system. Suitable reactors which may be employed in the carbonylation of methanol and/or a reactive derivative thereof, and configuration thereof, are generally known in the art.

For example, in certain embodiments, the carbonylation of methanol and/or a reactive derivative thereof with carbon monoxide in the presence of a Group VIII metal carbonylation catalyst and methyl iodide is performed to produce acetic acid in the reaction zone of an acetic acid production unit. In certain embodiments, the reactive derivative of methanol is, for example, methyl acetate, dimethyl ether, or methyl iodide. Processes and Group VIII metal catalysts for the carbonylation of methanol are generally known in the art.

In certain embodiments, carbonylation of methanol and/or a reactive derivative thereof with carbon monoxide in the presence of a Group VIII metal catalyst system can be homogeneous or heterogeneous. For example, in certain embodiments, heterogeneous carbonylation is catalyzed by a Group VIII metal carbonylation catalyst (e.g., comprising rhodium and/or iridium) supported on an inert support (e.g., carbon, activated carbon). In certain such embodiments, the catalyst further comprises at least one metal promoter such as, for example, ruthenium, iron, nickel, lithium, and cobalt. In certain such embodiments, the methanol reactant can be provided to the reaction zone in the liquid and/or vapour phase. In certain desirable embodiments, methyl iodide and, optionally, water, are provided to the reaction zone in the vapour phase.

In another example, in certain embodiments, homogeneous carbonylation is catalyzed by a soluble Group VIII metal carbonylation catalyst (e.g., comprising rhodium and/or iridium) in a liquid reaction composition comprising methyl iodide, methyl acetate, and water. In certain such embodiments, the liquid reaction composition further comprises propionic acid by-product. In such embodiments, the carbonylation catalyst can be added to the liquid reaction composition in any form that can dissolve in the liquid reaction composition, or is convertible to a soluble form.

In certain embodiments as otherwise described herein, the iridium-containing carbonylation catalyst is selected from $IrCl_3$, $IrI_3$, $IrBr_3$, $[Ir(CO)_2I]_2$, $[Ir(CO)_2Cl]_2$, $[Ir(CO)_2Br]_2$, $[Ir(CO)_2I_2]^-$, $[Ir(CO)_2Br_2]^-$, $[Ir(CO)_2I_2]^-$, $[Ir(CH3)I_3(CO)_2]^-$, $Ir_4(CO)_{12}$, $IrCl_3.4H_2O$, $IrBr_3.4H_2O$, $Ir_3(CO)_{12}$, iridium metal, $Ir_2O_3$, $IrO_2$, $Ir(acac)(CO)_2$, $Ir(acac)_3$, iridium acetate, $[Ir_3O(OAc)_6(H_2O)_3][OAc]$, and hexachloroiridic acid $[H_2IrCl_6]$. In certain desirable embodiments, the catalyst comprises a chloride-free complex of iridium such as, for example, acetates, oxalates, and acetoacetates. In certain embodiments as otherwise described herein, the concentration of iridium-containing carbonylation catalyst in the liquid reaction composition is within the range of 100 ppm to 6,000 ppm by weight (ppmw) of iridium.

In certain embodiments as otherwise described herein, the rhodium-containing carbonylation catalyst is selected from $[Rh(CO)_2Cl]_2$, $[Rh(CO)_2I]_2$, $[Rh(Cod)Cl]_2$, rhodium (III) chloride, rhodium (III) chloride trihydrate, rhodium (III) bromide, rhodium (III) iodide, rhodium (III) acetate, rhodium dicarbonylacetylacetonate, $RhCl_3(PPh_3)_3$ and $RhCl(CO)(PPh_3)_2$. In certain embodiments as otherwise described herein, the concentration of rhodium-containing carbonylation catalyst in the liquid reaction composition is at least 1 ppm (i.e., up to the solubility limit of the catalyst in the liquid reaction composition, or in a downstream product recovery zone), for example, within the range of 10 ppmw to 1,500 ppmw of rhodium.

In certain embodiments as otherwise described herein, the liquid reaction composition comprises an iridium carbonylation catalyst and further comprises a promoter selected from ruthenium, osmium, and rhenium. For example, in certain desirable embodiments, the liquid reaction composition comprises an iridium carbonylation catalyst and further comprises a ruthenium-containing compound soluble in the liquid reaction composition. In such embodiments, the ruthenium-containing compound can be added to the liquid reaction composition in any form that can dissolve in the liquid reaction composition, or is convertible to a soluble form. In certain such embodiments, the ruthenium-containing compound comprises a chloride-free compound such as, for example, acetates. In certain such embodiments, the ruthenium-containing compound is selected from ruthenium (III) chloride, ruthenium (III) chloride trihydrate, ruthenium (IV) chloride, ruthenium (III) bromide, ruthenium (III) iodide, ruthenium metal, ruthenium oxides, ruthenium (III) formate, $[Ru(CO)_3I_3]^-H^+$, tetra(aceto)chlororuthenium (II, III), ruthenium (III) acetate, ruthenium (III) propionate, ruthenium(III) butyrate, ruthenium pentacarbonyl, triruthenium dodecacarbonyl and mixed ruthenium halocarbonyls such as dichlorotricarbonylruthenium (II) dimer, dibromotricarbonylruthenium (II) dimer, and other organoruthenium complexes such as tetrachlorobis(4-cymene)diruthenium (II), tetrachlorobis(benzene)diruthenium(II), dichloro(cycloocta-1,5-diene)ruthenium (II) polymer and tris(acetylacetonate)ruthenium (III). In certain desirable embodiments, the ruthenium-containing compound is free of impurities that provide or can generate in-situ ionic iodides that can inhibit the reaction, such as, for example, alkali or alkaline earth metal salts, or other metal salts.

In certain embodiments, the ruthenium promoter is present in the liquid reaction composition in an effective amount (e.g., up to the solubility limit of the promoter in the liquid reaction composition, or in a downstream product recovery zone).

In other embodiments, the liquid composition comprises a rhodium carbonylation catalyst and further comprises a promoter selected from alkali metals and/or an organic iodide such as, for example, a quaternary ammonium iodide. In certain desirable embodiments, the liquid composition comprises a rhodium carbonylation catalyst and further comprises a lithium iodide promoter.

In certain embodiments as otherwise described herein, the liquid reaction composition comprises a rhodium carbonylation catalyst, and methyl acetate is present in the liquid reaction composition in an amount within the range of 0.1 wt. % to 70 wt. %. In other embodiments, the liquid reaction composition comprises an iridium carbonylation catalyst, and methyl acetate is present in the liquid reaction composition in an amount within the range of 1 wt. % to 70 wt. %. In certain desirable embodiments, methyl acetate is present in the liquid reaction composition in an amount within the range of 2 wt. % to 50 wt. %, e.g., 3 wt. % to 35 wt. %.

As described above, water is present in the liquid reaction composition. The person of ordinary skill in the art will appreciate that water is formed in situ in the liquid reaction composition by the esterification reaction between methanol and acetic acid product. In certain embodiments, water may also be introduced to the carbonylation reaction zone (e.g., together with, or separately from other components of the liquid reaction composition). In certain desirable embodiments, water is present in the liquid reaction composition in an amount within the range of 0.1 wt. % to 15 wt. %, e.g., within the range of 1 wt. % to 15 wt. %, or within the range of 1 wt. % to 8 wt. %.

As described above, propionic acid by-product can also be present in the liquid reaction composition. In certain embodiments, propionic acid is present in the liquid reaction composition in an amount within the range of 200 ppmw to 2,500 ppmw, e.g., within the range of 400 ppmw to 2,000 ppmw, or within the range of 600 ppmw to 1,400 ppmw.

In certain desirable embodiments, methyl iodide is present in the liquid reaction composition in an amount within the range of 1 wt. % to 20 wt. %. For example, in certain such embodiments, methyl iodide is present in the liquid reaction composition in an amount within the range of 2 wt. % to 16 wt. %. In certain embodiments as otherwise described herein, the liquid reaction composition comprises a solvent. For example, in certain such embodiments, the liquid reaction composition comprises an acetic acid solvent (e.g., recycled from a separation zone of the acetic acid production unit).

As described above, acetic acid can be produced in the reaction zone by carbonylation of methanol and/or a reactive derivative thereof with carbon monoxide. In certain embodiments as otherwise described herein, the carbon monoxide provided to the reaction zone is essentially pure. In other embodiments, the carbon monoxide provided to the reaction zone contains one or more impurities such as, for example, carbon dioxide, methane, nitrogen, hydrogen, or noble gases. In certain embodiments as otherwise described herein, the partial pressure of carbon monoxide (e.g., in a reactor of the reaction zone) is within the range of 1 bar to 70 bar, e.g., within the range of 1 bar to 35 bar.

In certain embodiments as otherwise described herein, the carbonylation reaction is conducted at a total pressure (e.g., in a reactor of the reaction zone) within the range of 10 barg to 100 barg. In certain embodiments as otherwise described herein, the carbonylation reaction is conducted at a temperature (e.g., in a reactor of the reaction zone) within the range of 100° C. to 300° C. For example, in certain such embodiments, the carbonylation reaction is conducted at a temperature within the range of 150° C. to 210° C., or 170° C. to 195° C., or 185° C. to 195° C.

The carbonylation process can be conducted as a batch process or as a continuous process. In certain desirable embodiments, the carbonylation process is conducted as a continuous process.

As described above, the acetic acid production unit includes a separation zone, the zone comprising a tank for separating an effluent of the reaction zone. FIG. 1 is a schematic cross-sectional view of a tank in accordance with one embodiment of the present disclosure. As shown in FIG. 1, tank 100 includes a bottom section 110 comprising a feed inlet 112. In certain embodiments, feed inlet 112 is in fluid communication with an outlet of a reaction zone of an acetic production unit (not shown).

The tank 100 includes, above the bottom section 110, a fractionation section 120. In certain embodiments as otherwise described herein, the fractionation section includes one or more (e.g., one or two) fractionation trays. In the embodiment of FIG. 1, the fractionation section 120 includes one fractionation tray 122. In certain embodiments as otherwise described herein, each of the fractionation trays has a horizontal surface area of at least 75% (e.g., at least 80%, at least 90%, or at least 95%) of the surface area of an internal cross-section of the tank. In certain embodiments as otherwise described herein, each tray is selected from bubble cap trays, tunnel cap trays, grid trays, sieve trays, fixed-valve trays, and movable-valve trays. In certain desirable embodiments, each tray is a fixed-valve tray.

The tank 100 includes, above the fractionation section 120, a spray section 150 including one or more spray nozzles 156 extending from and in fluid communication with a spray header 152, the spray header 152 in fluid communication with a header inlet 154 configured to receive a spray liquid. In the embodiment of FIG. 1, spray nozzles 156 extend from the header towards a demister section 160 and terminate above chimney exits 136. In certain embodiments as otherwise described herein, the spray section comprises 2-10 spray nozzles, e.g., 2-8 spray nozzles, or 2-6 spray nozzles, or 2-4 spray nozzles, or 4-10 spray nozzles, or 6-10 spray nozzles, or 8-10 spray nozzles.

The tank 100 includes, above the spray section 150, the demister section 160 including a porous demister surface 162. In certain embodiments as otherwise described herein, the porous demister surface comprises a mesh spanning an internal cross-section of the tank. In certain such embodiments, the porous demister surface comprises a mesh extending perpendicularly to a vertical axis of the tank (e.g., as shown in FIG. 1). In other such embodiments, the porous demister surface comprises a mesh extending at an angle within the range of 40°-90° (e.g., 50°-90°, or 60°-90°, or 40°-80°, or 40°-70°) from a vertical axis of the tank. In certain embodiments as otherwise described herein, the porous demister surface comprises two or more meshes, each individually extending at an angle within the range of 40°-90° (e.g., 50°-90°, or 60°-90°, or 40°-80°, or 40°-70°) from a vertical axis of the tank. For example, in certain such embodiments, the porous demister surface comprises a first mesh spanning a first portion of an internal cross-section of the tank and extending at an angle within the range of 40°-90° from a vertical axis of the tank, and a second mesh spanning a second portion of the internal cross-section and extending away from the first mesh, at an angle within the range of 40°-90° from a vertical axis of the tank. The person of ordinary skill in the art will appreciate that such embodiments can provide a total surface area of the porous demister surface that is greater than that of a horizontal cross-section of the tank.

In certain embodiments as otherwise described herein, the porous demister surface comprises a metal or a polymer. In certain such embodiments, the porous demister surface comprises a mesh, pad, or cloth comprising a metal or a polymer. In other such embodiments, the porous demister surface comprises a co-knit demister surface comprising a metal and a polymer. For example, in certain desirable embodiments, the porous demister surface comprises a polymer mesh (e.g., comprising polypropylene, polyethylene, polyvinyl chloride, polytetrafluoroethylene, etc.) or a metal mesh.

The tank 100 includes, above the demister section 160, a top section 170 comprising a vapour outlet 172. In certain embodiments, vapour outlet 172 is in fluid communication with an inlet of a light ends recovery zone (not shown).

The tank 100 includes at least one chimney tray 130 having a base 132 above the fractionation section 120 and one or more chimneys 134 extending from the base 132 and providing fluid communication, through chimney exits 136, between the fractionation section 120 and the spray section 150. In the embodiment of FIG. 1, spray header 152 is positioned below one or more chimney exits 136 of the chimney tray 130. In certain embodiments as otherwise described herein, the at least one chimney tray comprises 2-100 chimneys, e.g., 2-80 chimneys, or 2-60 chimneys, or 2-40 chimneys, or 2-20 chimneys, or 20-100 chimneys, or 40-100 chimneys, or 60-100 chimneys, or 80-100 chimneys.

The tank 100 includes, in fluid communication with the base of chimney tray 130, a liquid return 140 comprising outlets 142 and 144 positioned in the fractionation section 120 and the bottom section 110, respectively.

In operation, at least a portion of an effluent of a carbonylation reaction zone (e.g., as otherwise described herein) is provided as a pressurized feed to tank 100 through inlet 112. In certain embodiments as otherwise described herein, the pressure at the inlet is at least about 1 barg, e.g., within the range of 1 barg to 10 barg, or 1 barg to 5 barg, or 1 barg to 4 barg, or 1 barg to 3 barg, or 1.5 barg to 2.5 barg.

The effluent comprises water and acetic acid. In certain embodiments as otherwise described herein, the effluent further comprises one or more of methyl iodide, methyl acetate, and a Group VII metal carbonylation catalyst. For example, in certain such embodiments, the effluent comprises 5-95 wt. % acetic acid, 0.1-70 wt. % methyl acetate, 0.1-15 wt. % water, 10-6,000 ppmw Group VIII metal carbonylation catalyst, 1-20 wt. % methyl iodide, and 200-2,500 ppmw propionic acid.

In the bottom section 110, at least a portion of the effluent evaporates to form a vapour fraction. The vapour fraction passes from the bottom section 110, through the fractionation section 120, and through the one or more chimneys 134 of the at least one chimney tray 130, into the spray section 150. Advantageously, the present inventors have determined that the at least one chimney tray can desirably limit loading of the demister section of the tank with liquids comprising one or more carbonylation reaction components or by-products (e.g., dissolved catalyst) by preventing substantial amounts of entrained liquid from the fractionation section (e.g., operating in a "spray" regime) from passing into the spray section of the tank.

In certain embodiments as otherwise described herein, the pressure at the bottom section of the tank (e.g., the bottom section 110 of FIG. 1) is at least 1 barg, e.g., 1-5 barg, or 1-3 barg. In certain embodiments as otherwise described herein, the pressure drop from the bottom section of the tank (e.g., the bottom section 110 of FIG. 1) to the top section of the tank (e.g., the top section 170) is at least 5 mbar, e.g., at least 10 mbar, at least 15 mbar, or at least 25 mbar.

As the vapour fraction passes through the demister section 160, entrained liquid is retained on the porous demister surface 162 of the demister section 160 (e.g., as droplets of de-entrained liquid), and then returned via gravity to the chimney tray 130.

Spray liquid provided to the spray header 152 through inlet 154 is sprayed onto the porous demister surface 162 of the demister section 160, through spray nozzles 156 terminating above the chimney exits 136 of the chimney tray 130. Advantageously, the present inventors have determined that positioning the spray header above the base of the chimney tray but below the exits of the chimneys extending therefrom can desirably minimize or even avoid locally high vapour velocity in the spray section of the tank.

Spray liquid from the spray nozzles 156 washes de-entrained liquid from the porous demister surface 162 of demister section 160. Desirably, the spray liquid can contribute to growth and coalescence of droplets of de-entrained liquid retained on the porous demister surface, and can minimize precipitation of reaction components and byproducts dissolved therein (e.g., as the droplets fall to the chimney tray). In certain embodiments as otherwise described herein, the spray liquid comprises water. In certain such embodiments, the spray liquid comprises one or more of methyl acetate, methyl iodide, acetic acid, and methanol.

De-entrained liquid (i.e., a liquid fraction of the effluent of the reaction zone) and spray liquid are collected in the base 132 of the at least one chimney tray 130. A portion of the collected liquid is transferred, through liquid return 140, to the fractionation section 120 (through outlet 142) and the bottom section 110 (through outlet 144). In certain embodiments as otherwise described herein, substantially all of the returned liquid is returned to the fractionation section of the tank. In other embodiments, substantially all of the returned liquid is returned to the bottom section of the tank. In certain embodiments as otherwise described herein, 0-100 vol. %, or 25-100 vol. %, or 50-100 vol. %, or 75-100 vol. %, or 50-75 vol. % of the returned liquid is returned to the bottom section of the tank (e.g., and the balance is returned to the fractionation section). Another portion of the collected liquid is withdrawn from the tank, through outlet 146. As the person of ordinary skill in the art will appreciate, the withdrawn liquid can be used in a number of ways, e.g., as recycle to the reaction zone, and/or for recovery of catalyst.

After passing through the demister section 160, the vapour fraction is withdrawn from the top section 170, through outlet 172. In certain embodiments as otherwise described herein, the vapour fraction withdrawn from the tank comprises at least 25 wt. % acetic acid. For example, in certain such embodiments, the vapour fraction withdrawn from the tank comprises at least 30 wt. %, or at least 40 wt. %, or at least 50 wt. % acetic acid. In certain embodiments, the vapour fraction comprises one or more of methyl iodide (e.g., up to 25 wt. %, or 2-25 wt. % methyl iodide), methyl acetate (e.g., up to 30 wt. %, or 2-30 wt. % methyl acetate), and water (e.g., up to 20 wt. %, or 0.5-20 wt. % water).

In certain embodiments, the vapour fraction withdrawn from the tank is transferred to a light ends recovery zone of the acetic acid production unit.

A liquid fraction of the effluent (e.g., remaining after formation of the vapour fraction) and, in certain embodiments, collected liquid returned from the chimney tray 130, are removed from the bottom section 110, through inlet 114. In certain embodiments, the liquid withdrawn from the tank is transferred to the reaction zone of the acetic production unit as recycle.

In certain embodiments, the light ends recovery zone of the acetic acid production unit is configured to separate at least the components (e.g., of the vapour fraction withdrawn from the tank, as otherwise described herein) that are more volatile than acetic acid, from acetic acid. For example, in certain embodiments, acetic acid is produced in the reaction zone by carbonylation of methanol and/or a reactive derivative thereof with carbon monoxide in the presence of a Group VIII metal catalyst system, and the light ends recovery zone of the acetic acid production unit is configured to separate acetic acid and to further separate methyl iodide and methyl acetate, which can be recycled to the reaction zone.

In certain embodiments as otherwise described herein, the light ends recovery zone comprises a distillation column that separates crude acetic acid product comprising acetic acid and propionic acid from a light ends fraction including methyl iodide and methyl acetate. In certain such embodiments, the light ends recovery zone further comprises a drying column. For example, in certain embodiments as otherwise described herein, the light ends recovery zone comprises a combined light ends and drying column, in which water is removed from crude acetic acid product to form a dry acetic acid product comprising acetic acid and propionic acid. As used herein, a "dry" or "dried" stream comprising acetic acid (e.g., and optionally propionic acid) comprises water in an amount of at most 1,500 ppmw.

Suitable columns which may be employed in the light ends recovery zone, and configurations thereof, are generally known in the art. Typically, at least a first fraction comprising acetic acid and propionic acid, and an overhead vapour fraction comprising methyl acetate, water, acetic acid, carbon monoxide, and methyl iodide are formed in the light ends recovery zone. In certain embodiments, the separated water can be recycled to the reaction zone, or removed from the acetic acid production unit.

In certain embodiments as otherwise described herein, the light ends recovery zone further comprises one or more condensers and/or coolers to condense the overhead vapour fraction and form a liquid fraction. The person of ordinary skill in the art will appreciate that any suitable method known in the art to condense the overhead vapour fraction to the liquid phase can be employed. For example, in certain embodiments, the fraction is condensed using at least one heat exchanger (e.g., supplied with water as cooling medium). Components of the overhead fraction that are not condensed (e.g., carbon monoxide, carbon dioxide, inert gases, reaction by-product gases) are removed from the light ends recovery zone as an off-gas stream. In certain embodiments, acetic acid is produced in the reaction zone by carbonylation of methanol and/or a reactive derivative thereof with carbon monoxide in the presence of a Group VIII metal catalyst system, and the off-gas stream removed from the light ends recovery zone further comprises methyl iodide (e.g., present as entrained and/or evaporated methyl iodide), methyl acetate, and water.

In certain embodiments, the liquid fraction formed in the light ends recovery zone comprises methyl acetate, water, and acetic acid. In certain embodiments, acetic acid is produced in the reaction zone by carbonylation of methanol and/or a reactive derivative thereof with carbon monoxide in the presence of a Group VIII metal catalyst system, and the liquid fraction further comprises methyl iodide. In certain embodiments, the liquid fraction further comprises entrained or dissolved gaseous components (e.g., carbon monoxide, carbon dioxide, inert gases).

In certain embodiments as otherwise described herein, the light ends recovery zone comprises a decanter, in which the liquid fraction is separated into two layers: a lower (e.g., organic) layer comprising methyl acetate and an upper (e.g., aqueous) layer comprising water. In certain embodiments, acetic acid is produced in the reaction zone by carbonylation of methanol and/or a reactive derivative thereof with carbon monoxide in the presence of a Group VIII metal catalyst system, and the lower layer further comprises methyl iodide. In certain embodiments, at least a portion (e.g., all) of the upper layer from the decanter is returned to a distillation column of the light ends recovery zone, as a reflux stream. In certain embodiments, at least a portion (e.g., all) of the upper layer from the decanter is recycled to the reaction zone. In certain embodiments, off-gas is withdrawn from the decanter and transferred to an off-gas scrubbing unit (e.g., before disposal).

In certain embodiments, a stream comprising acetic acid and propionic acid from the light ends recovery section (e.g., the first fraction formed in the light ends recovery section) is transferred to a heavy ends column through a feed inlet positioned at an intermediate point in the column. In such embodiments, a stream comprising propionic acid is withdrawn from the heavy ends column through a heavy product outlet, and acetic acid is removed as a product stream at one or more outlets of the column (e.g., as an overhead stream from an outlet at the top of the column, as a sidedraw stream from an outlet positioned higher than the feed inlet). In certain embodiments, the product stream comprises essentially acetic acid, and comprises less than 400 ppmw, or less than 300 ppmw, or less than 250 ppmw of propionic acid. In certain embodiments, the product stream comprises essentially acetic acid, and comprises less than 1,500 ppmw of water. In certain desirable embodiments, the product stream comprises essentially acetic acid, and comprises less than 1,500 ppmw of a combined total of propionic acid and water. Suitable columns which may be employed as a heavy ends column, and configurations thereof, are generally known in the art. For example, in certain embodiments, the heavy ends column is connected to a condenser. In another example, in certain embodiments, a reboiler is connected to the base of the heavy ends column.

The entire contents of each and every patent and non-patent publication cited herein are hereby incorporated by reference, except that in the event of any inconsistent disclosure or definition from the present specification, the disclosure or definition herein shall be deemed to prevail.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A process for separating an effluent of a carbonylation reaction zone of an acetic acid production unit in a tank, the effluent comprising water and acetic acid, the tank comprising
a bottom section comprising a feed inlet;
above the bottom section, a fractionation section;
above the fractionation section, a spray section;
above the spray section, a demister section comprising a porous demister surface;
above the demister section, a top section comprising a vapour outlet; and
at least one chimney tray having a base above the fractionation section and one or more chimneys extending from the base and providing fluid communication between the fractionation section and the spray section;
the process comprising
through the feed inlet, transferring at least a portion of the effluent to the bottom section of the tank;
evaporating at least a portion of the effluent to form a vapour fraction;
from the spray section of the tank, spraying a spray liquid onto the porous demister surface of the demister section;
in the at least one chimney tray, collecting a liquid fraction of the effluent and at least a portion of the spray liquid sprayed onto the porous demister surface of the demister section;
returning at least a portion of the collected liquid to the fractionation section and/or the bottom section of the tank; and
through the vapour outlet, withdrawing from the tank at least a portion of the vapour fraction of the reaction section effluent, the vapour fraction comprising acetic acid, the vapour fraction having been passed from the bottom section through the fractionation section, through the one or more chimneys of the at least one chimney tray, and through the porous demister surface of the demister section.

2. A process according to claim 1, wherein the reaction zone effluent further comprises one or more of methyl iodide, methyl acetate, a Group VIII metal carbonylation catalyst, and propionic acid.

3. A process according to claim 1, wherein the fractionation section of the tank includes one or more fractionation trays, each having a horizontal surface area of at least 75% of the surface area of an internal cross-section of the tank.

4. A process according to claim 1, wherein the spray section of the tank comprises a spray header below the exits of one or more chimneys of the chimney tray, and one or more spray nozzles extending from the header towards the demister section and terminating above the exits of the chimneys of the chimney tray.

5. A process according to claim 1, further comprising withdrawing from the tank a portion of the collected liquid of the at least one chimney tray.

6. A process according to claim 1, wherein 0-100 vol. % of the collected liquid returned from the at least one chimney tray is returned to the bottom section of the tank.

7. A process according to claim 1, wherein the porous demister surface comprises a mesh spanning an internal cross-section of the tank.

8. A process according to claim 1, wherein the porous demister surface comprises a polymer mesh or a metal mesh.

9. A process according to claim 1, wherein the vapour fraction withdrawn from the tank comprises at least 25 wt. % acetic acid.

10. A process according to claim 1, wherein the vapour fraction withdrawn from the tank comprises 2-25 wt. % methyl iodide, 2-30 wt. % methyl acetate, and 0.5-20 wt. % water.

11. A process according to claim 1, wherein the pressure in the bottom section of the tank is at least 1 barg, and the pressure drop from the bottom section of the tank to the top section of the tank is at least 5 mbar.

12. A process according to claim 1, further comprising transferring at least a portion of the vapour fraction withdrawn from the tank to a light ends recovery zone of the acetic acid production unit.

13. A process according to claim 1, further comprising
from the bottom section of the tank, withdrawing at least a portion of the liquid fraction from the tank; and then
transferring at least a portion of the liquid fraction withdrawn from the tank to the reaction zone as recycle.

\* \* \* \* \*